United States Patent
Ashtiani et al.

(10) Patent No.: US 6,475,576 B1
(45) Date of Patent: Nov. 5, 2002

(54) REINFORCED INTERIOR TRIM PANEL ASSEMBLY AND METHOD

(75) Inventors: Mansour Ashtiani, Beverly Hills; David Wayne Whitehead, Rochester Hills, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/711,424

(22) Filed: Nov. 13, 2000

Related U.S. Application Data

(60) Provisional application No. 60/173,655, filed on Dec. 30, 1999.

(51) Int. Cl.[7] .............................................. B60R 13/00
(52) U.S. Cl. .............................. 428/31; 428/45; 428/61; 428/81; 428/114; 264/40.5; 264/46.7; 264/113; 264/257; 296/153
(58) Field of Search ............................ 428/31, 179, 45, 428/81, 61, 174; 296/39.1, 153; 264/46.7, 257, 113, 40.5

(56) References Cited

U.S. PATENT DOCUMENTS 5,501,829 A * 3/1996 Nichols ...................... 264/261
6,203,089 B1 * 3/2001 Doolittle, III et al. ..... 296/39.1

* cited by examiner

*Primary Examiner*—Deborah Jones
*Assistant Examiner*—Abraham Bahta
(74) *Attorney, Agent, or Firm*—Kathryn A. Marra

(57) ABSTRACT

A reinforced interior trim panel assembly and method of making same for attachment to structure of a vehicle includes a reinforcement and a carrier formed from a plastic material for attachment to the structure of the vehicle and incorporating the reinforcement within the plastic material.

10 Claims, 3 Drawing Sheets

REINFORCED INTERIOR TRIM PANEL ASSEMBLY AND METHOD

CROSS-REFERENCE TO RELATED APPLICATION(S)

The present invention claims the priority date of U.S. Provisional Patent Application Ser. No. 60/173,655, filed Dec. 30, 1999 abandoned.

TECHNICAL FIELD

The present invention relates generally to interior trim panels for vehicles and, more particularly, to a reinforced interior trim panel assembly and method of making same for a vehicle.

BACKGROUND OF THE INVENTION

It is known to provide an interior trim panel assembly for a vehicle to present an aesthetically pleasing appearance in an occupant compartment of the vehicle. The interior trim panel assembly may be a door trim panel assembly having a plurality of separate components with each component having a specific function. The components typically include an interior trim, sound absorber, water barrier, insert, armrest, and map pocket closeout and side impact blocks. The components are assembled together and attached to an interior trim substrate by several different conventional processes including adhesives, heat staking, sonic welding, and fasteners. The interior trim panel assembly is then mounted to a panel such as a inner door panel of a door for the vehicle by suitable means such as fasteners.

Although the above interior trim panel assembly has worked well, it is desirable to reinforce an interior trim panel assembly. It is also desirable to provide a reinforced thermoplastic bead molded interior trim panel assembly. Therefore, there is a need in the art to provide a reinforced interior trim panel assembly and method of making same for a vehicle.

SUMMARY OF THE INVENTION

It is, therefore, one object of the present invention to provide a reinforced interior trim panel assembly for a vehicle.

It is another object of the present invention to provide a method of reinforcing an interior trim panel assembly made by molding with thermoplastic beads.

To achieve the foregoing objects, the present invention is a reinforced interior trim panel assembly for attachment to structure of a vehicle including a reinforcement and a carrier formed from a plastic material for attachment to the structure of the vehicle and incorporating the reinforcement within the plastic material.

In addition, the present invention is a method of making a reinforced interior trim panel assembly for attachment to structure of a vehicle. The method includes the steps of placing a reinforcement into a cavity of a mold and filling the cavity with a plastic material. The method also includes the steps of introducing steam into the mold to expand the plastic material to form a carrier with the reinforcement disposed within the carrier and bonding the carrier against the reinforcement to form a single reinforced interior trim panel assembly.

One advantage of the present invention is that a reinforced interior trim panel assembly is provided for a vehicle. Another advantage of the present invention is that a method is provided for making a reinforced interior trim panel assembly having improved strength especially with thermoplastic bead molded products. Yet another advantage of the present invention is that the method provides interior trim panel assemblies with higher tensile strength and improved dimensional stability. Still another advantage of the present invention is that the reinforced interior trim panel assembly may incorporate wire meshes for reinforcement, improving the EMI shielding quality of the assembly.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
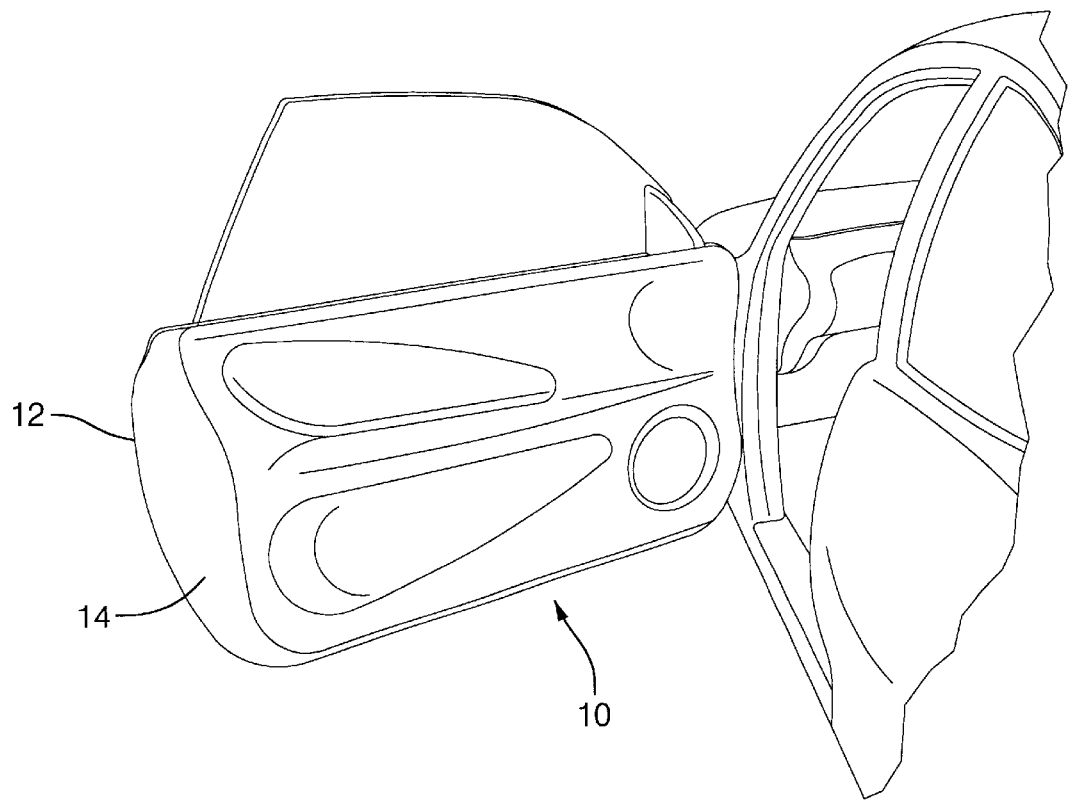
FIG. 1 is a perspective view of a reinforced interior trim panel assembly, according to the present invention, illustrated in operational relationship with a door of a vehicle.
Figure 2:
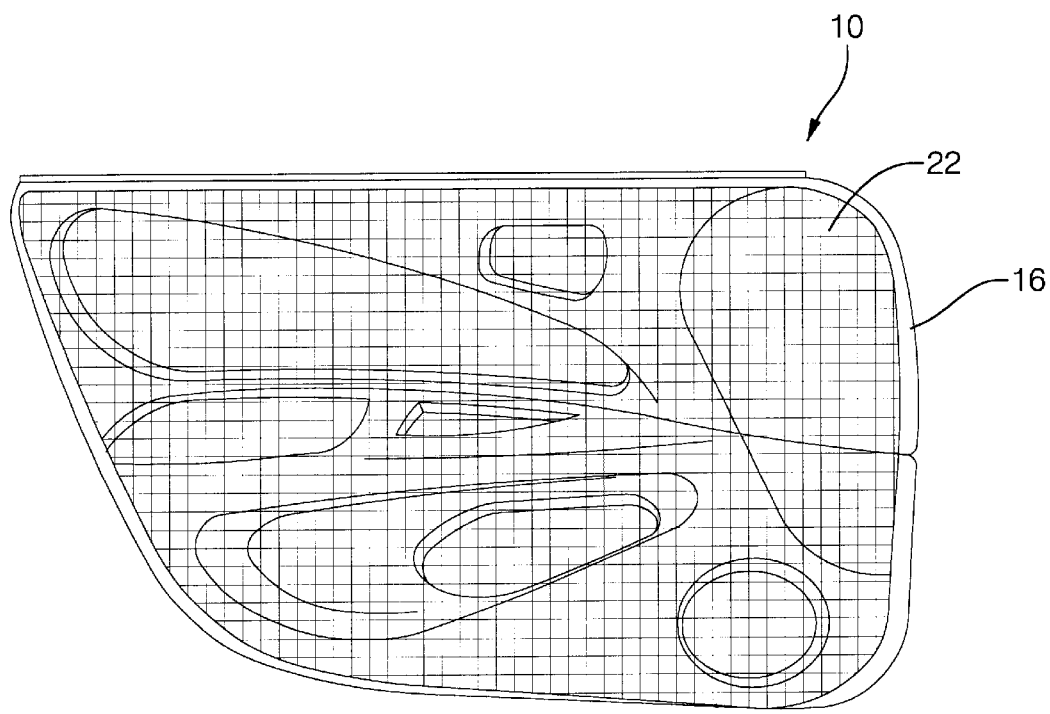
FIG. 2 is a rear elevational view of the reinforcement used in the reinforced interior trim panel assembly of FIG. 1.
Figure 3:
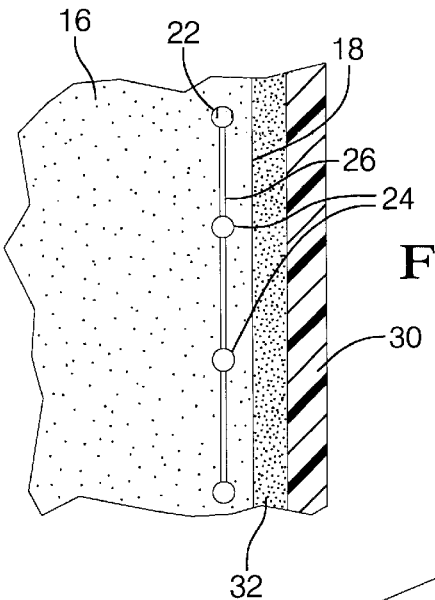
FIG. 3 is a fragmentary side view of the reinforced interior trim panel assembly of FIG. 1.
Figure 4:
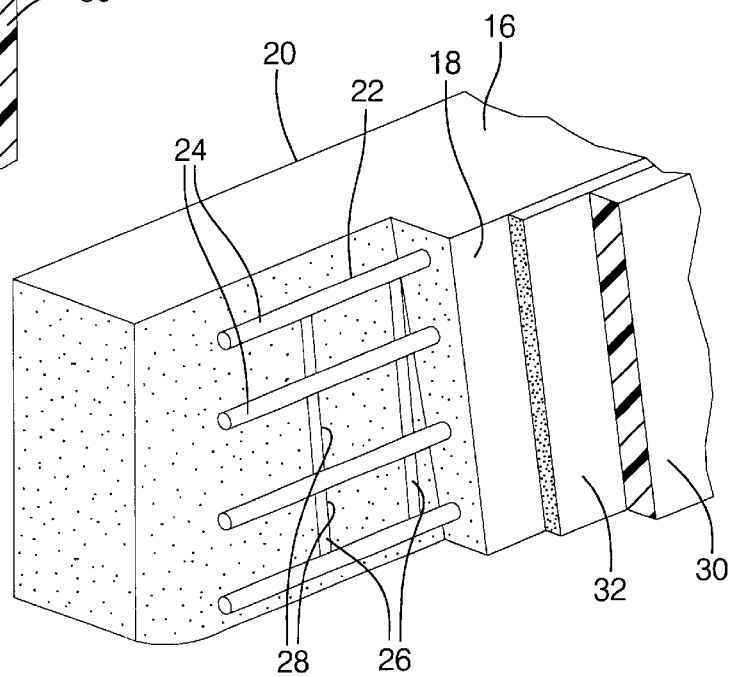
FIG. 4 is a fragmentary perspective view of the reinforced interior trim panel assembly of FIG. 1.

Referring to the drawings and in particular FIGS. 1 through 8, one embodiment of a reinforced interior trim panel assembly 10, according to the present invention, is shown mounted to structure such as a door 12 of a vehicle. It should be appreciated that, in this example, the reinforced interior trim panel assembly 10 is mounted to an inner panel 14 of the door 12. It should also be appreciated that the reinforced interior trim panel assembly 10 may be an assembly mounted to other structure or panels of the vehicle.

The reinforced interior trim panel assembly 10 includes a carrier 16 extending longitudinally and vertically and having a generally rectangular shape. The carrier 16 is made of a plastic material such as polypropylene. Preferably, the carrier 16 is made of expanded polypropylene. The carrier 16 is formed by a method, according to the present invention, to be described. The carrier 16 has an inner side 18 and an outer side 20. The outer side 20 is attached to the inner panel 14 of the door 12 by suitable means such as fasteners (not shown).

The reinforced interior trim panel assembly 10 includes a reinforcement 22 disposed in the carrier 16 to strengthen the carrier 16. The reinforcement 22 has a plurality of first wires 24 extending longitudinally and spaced vertically. The reinforcement 22 also has a plurality of second wires 26 extending vertically and spaced longitudinally to form a wire mesh with apertures 28 extending therethrough. The apertures 28 are generally rectangular in shape. The reinforcement 22 is a relatively rigid preformed reinforcing material having a melting point greater than material for the carrier 16 such as a polyester, nylon, or other thermoplastic mesh, wood fiber mesh, knitted metal mesh, injection molded plastic mesh, or fiberglass open mesh.

Figure 5:
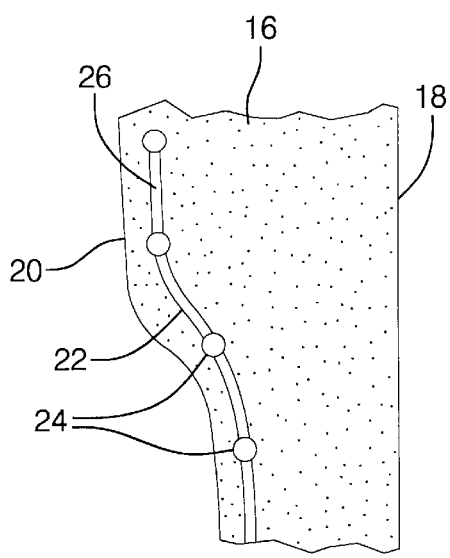
FIG. 5 is a fragmentary side view of the reinforced interior trim panel assembly of FIG. 1 illustrating a reinforcement in a first position.
Figure 6:
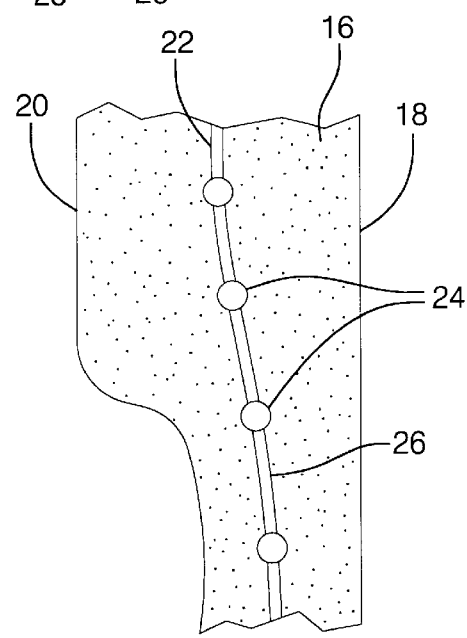
FIG. 6 is a fragmentary side view of the reinforced interior trim panel assembly of FIG. 1 illustrating the reinforcement in a second position.
Figure 7:
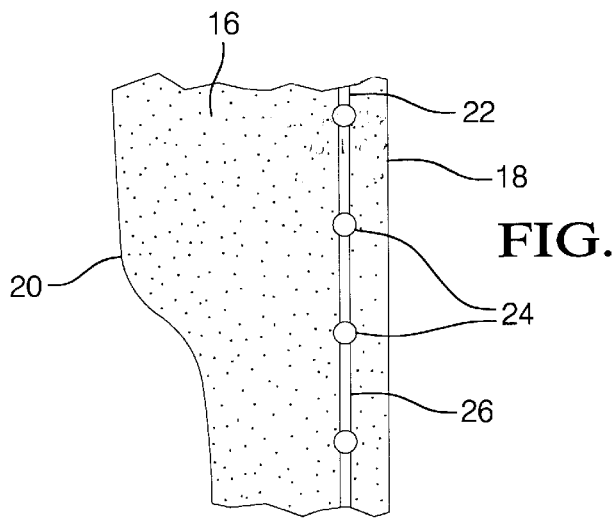
FIG. 7 is a fragmentary side view of the reinforced interior trim panel assembly of FIG. 1 illustrating the reinforcement in a third position.

As illustrated in FIG. 5, the reinforcement 22 may be located near the outer side 20 of the carrier 16. As illustrated in FIG. 7, the reinforcement 22 may be located near the inner side 18 of the carrier 16. As illustrated in FIG. 6, the reinforcement 22 may be located at any point between the outer side 20 and inner side 18 of the carrier 16. It should be appreciated that the reinforcement 22 may be any combination of the locations illustrated in FIGS. 5 through 7. It should also be appreciated that the reinforcement 22 is an open mesh so that the plastic in the form of beads can pass through the apertures 28 in the reinforcement 22. It should further be appreciated that the reinforcement 22 is a preform structure having a heat-activated adhesive thereon that will be activated by steam to ensure long term stability of the expanded polypropylene material of the carrier 16.

The reinforced interior trim panel assembly 10 also includes a plurality of components incorporated or integrated into the carrier 16. The components may include a finished interior trim substrate 30. The interior trim substrate 30 extends longitudinally and vertically and is generally rectangular in shape. The carrier 16 conforms to the shape of the interior trim substrate 30 such that the carrier 16 is disposed within the interior trim substrate 30. The interior trim substrate 30 is made of a relatively rigid material such as hard plastic, covered plastic, and covered cellulose based material or composite of the like. The covering can be fabric, vinyl, cloth, TPO, leather or carpet. The interior trim substrate 30 is formed by a suitable thermoplastic molding or forming process such as injection molding, compression molding, thermoforming or the like. It should be appreciated that the interior trim substrate 30 is a separate piece or component.

The components may also include a foam layer 32 disposed between the interior trim substrate 30 and the carrier 16. The foam layer 32 extends longitudinally and vertically in shape. The foam layer 32 is made of a plastic material such as polypropylene. It should be appreciated that the foam layer 32 and interior trim substrate 30 are facing materials and are optional.

Figure 8:
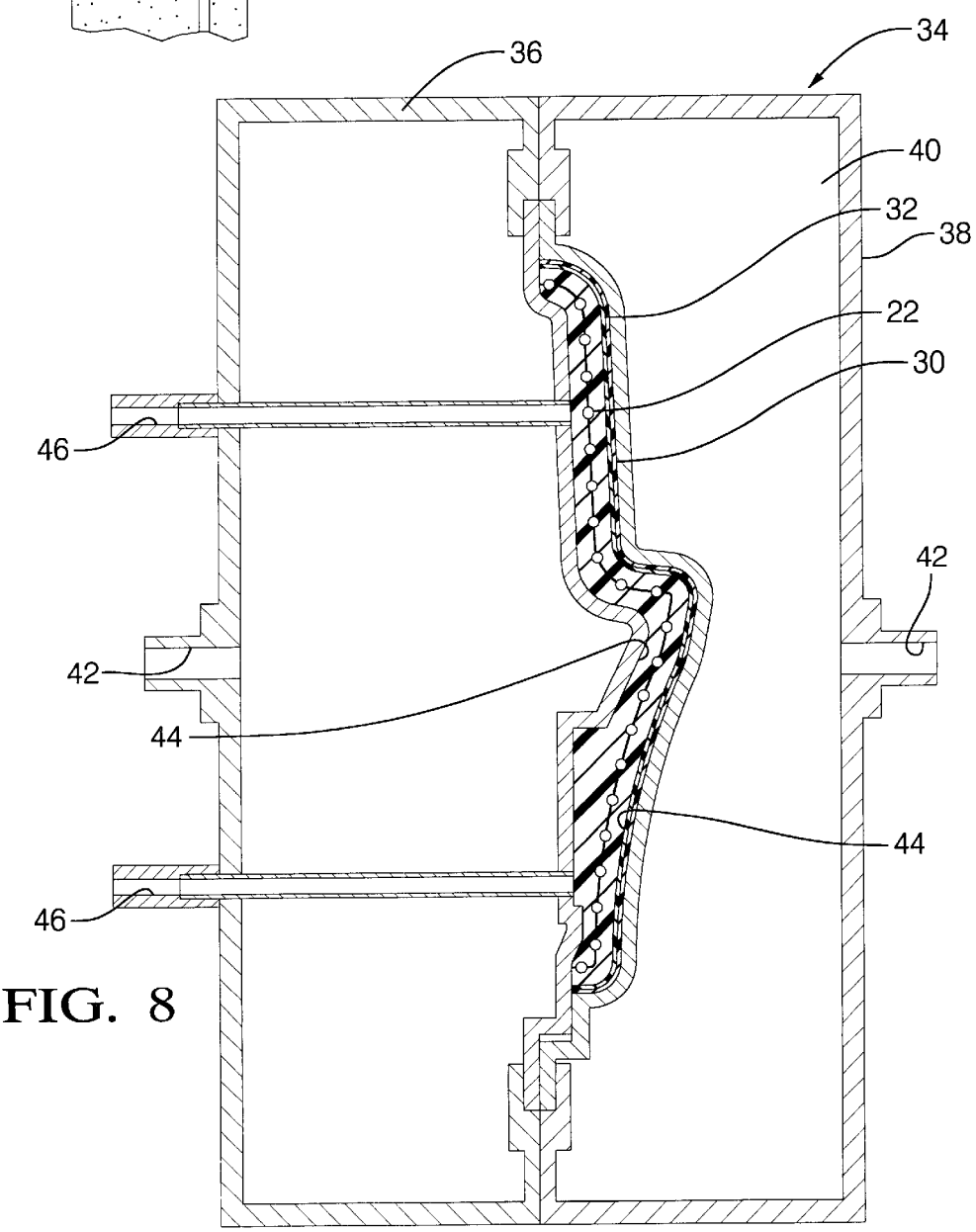
FIG. 8 is a fragmentary elevational view of a mold for a method, according to the present invention, of making the reinforced interior trim panel assembly of FIG. 1.

A method, according to the present invention, of making the reinforced interior trim panel assembly 10 is disclosed. As illustrated in FIG. 8, a mold, generally indicated at 34, of a steam chest type includes a first half mold 36 and a second half mold 38. The first and second half molds 36 and 38 are generally hollow to form a chamber 40. The first and second half molds 36 and 38 have an inlet 42 for allowing a fluid such as steam to enter the chamber 40 of the first and second half molds 36 and 38. The first and second half molds 36 and 38 each include a mold cavity 44 for forming the carrier 16. The first half mold 36 includes at least one, preferably a plurality of fill inlets 46 extending into the mold cavity 40 to allow fill guns to fill the mold cavity 44 with the plastic material for the carrier 16. It should be appreciated that the mold 34 is conventional and known in the art.

The method, according to the present invention, may include the step of forming the interior trim substrate 30 by conventional processes such as injection molding or other suitable thermoplastic molding or forming process (i.e., compression molding, thermoforming, etc.). The interior trim substrate 30 is preferably designed with at least one, preferably a plurality of "undercut" members to facilitate mechanical bonding of the carrier 16. The method includes the step of preheating the interior trim substrate 30 using an infrared oven (not shown) or the like. Preferably, the interior trim substrate 30 would be demolded from the injection molder (not shown) at higher-than-ambient temperature and placed into the cavity 44 of the mold 34.

The method may include the step of placing the interior trim substrate 30 into the cavity 44 of the mold 34. The method may include the step of placing the foam layer 32 into the cavity of the mold 34 and retaining the foam layer 32 using known retention methods. The method includes the step of placing the reinforcement 22 into the cavity 44 of the mold 34 and retaining the reinforcement 22 using known retention methods. The method includes the steps of closing the mold 34 and filling the cavity 44 with the plastic material for the carrier 16. In the preferred embodiment, the plastic material is in the form of thermoplastic beads that are blown into the cavity 44 of the mold 34 and are of a class of beads used in steam chest molding. Preferably, the thermoplastic beads are expanded polypropylene, but may be expanded polyethylene or expanded polystyrene (styrofoam). As such, the cavity 44 is filled with beads of expanded polypropylene blown therein, which enter the mold 34 via the fill inlets 46. It should be appreciated that the apertures 28 in the reinforcement 22 allow the beads to pass therethrough.

Next, the method includes the step of introducing steam into the mold 34 via the inlets 42 to expand the plastic material and bonding the plastic material to the reinforcement 22, foam layer 32, and door trim substrate 30 to form the interior trim panel assembly 10. In particular, steam enters the chambers 40 of the first and second half molds 34 and 36 through the inlets 42. The beads of expanded polypropylene are fused together with mechanical and thermoplastic bonding occurring to the door trim substrate 32. It should be appreciated that the steam enters through openings in the second half mold 36, door trim substrate 30 and first half mold 34 to expand the beads of polypropylene. It should also be appreciated that steam chest molding is conventional and known in the art.

The method may include the step of cooling the mold 34 by spraying a coolant such as water through nozzles (not shown) onto the backside of the cavity 44 of the mold 34. Once the reinforced interior trim panel assembly 10 is cooled or after a suitable time for fusion and cooling, the method includes the step of opening the mold 34 and removing or demolding the reinforced interior trim panel assembly 10 from the mold 34. Finally, the method includes the step of attaching the reinforced interior trim panel assembly 10 to the inner panel 14 of the door 12 by suitable means such as fasteners, adhesives, heat staking, sonic welding or the like.

Accordingly, the method of making the reinforced interior trim panel assembly 10 yields a part with substantially increased strength. The reinforcement 22 improves EMI shielding qualities of the reinforced interior trim panel assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A reinforced interior trim panel assembly for attachment to structure of a vehicle comprising:
   a reinforcement comprising an open mesh; and
   a carrier formed from an expanded plastic material for attachment to the structure of the vehicle and incorporating the reinforcement within the plastic material.

2. A reinforced interior trim panel assembly as set forth in claim 1 wherein said plastic material is one from a group comprising expanded polypropylene, expanded polyethylene, and expanded polystyrene.

3. A reinforced interior trim panel assembly as set forth in claim 1 wherein said reinforcement is a wire mesh.

4. A reinforced interior trim panel assembly as set forth in claim 1 wherein said reinforcement comprises a plurality of first wires extending longitudinally and spaced vertically and a plurality of second wires extending vertically and spaced longitudinally, said reinforcement being located adjacent an inner side of said carrier.

5. A reinforced interior trim panel assembly as set forth in claim 1 wherein said carrier has an inner side and an outer side.

6. A reinforced interior trim panel assembly as set forth in claim 5 wherein said reinforcement is located adjacent said inner side.

7. A reinforced interior trim panel assembly as set forth in claim 5 wherein said reinforcement is located adjacent said outer side.

8. A reinforced interior trim panel assembly as set forth in claim 5 wherein said reinforcement is located between said inner side and said outer side.

9. A reinforced interior trim panel assembly as set forth in claim 1 wherein said reinforcement is made of a thermoplastic material having a melting point greater than said plastic material of said carrier.

10. A reinforced thermoplastic bead molded interior door trim panel assembly for attachment to a door of a vehicle comprising:
    a reinforcement comprising an open wire mesh; and
    a carrier molded from expanded thermoplastic beads for attachment to the door of the vehicle and incorporating said reinforcement within said expanded thermoplastic beads.

* * * * *